US000001300H

United States Statutory Invention Registration [19]

[11] Reg. Number: H1300

Kondou et al. [43] Published: Apr. 5, 1994

[54] SILVER HALIDE LIGHT SENSITIVE COLOR PHOTOGRAPHIC MATERIAL

[75] Inventors: Toshiya Kondou, Hino; Toshihiko Yagi, Shiroyama; Hiroyuki Hoshino, Hino; Katsuhiko Heki, Hachioji, all of Japan

[73] Assignee: Konica Corporation, Tokyo, Japan

[21] Appl. No.: 851,280

[22] Filed: Mar. 16, 1992

Related U.S. Application Data

[63] Continuation of Ser. No. 577,745, Sep. 5, 1990, abandoned.

[30] Foreign Application Priority Data

Sep. 6, 1989 [JP] Japan ..... 1-232369

[51] Int. Cl.[5] ..... G03C 1/035
[52] U.S. Cl. ..... 430/567
[58] Field of Search ..... 430/567, 569

[56] References Cited

U.S. PATENT DOCUMENTS

| | | | |
|---|---|---|---|
| 4,668,614 | 5/1987 | Takada et al. | 430/567 |
| 4,713,318 | 12/1987 | Sugimoto et al. | 430/567 |
| 4,797,354 | 1/1989 | Saitou et al. | 430/567 |
| 4,945,037 | 7/1990 | Saitou | 430/567 |
| 4,963,467 | 10/1990 | Ishikawa et al. | 430/567 |
| 5,057,409 | 10/1991 | Suga | 430/567 |

OTHER PUBLICATIONS

James, T. H. The Theory of the Photographic Process, Fourth Edition, 1977, pp. 22–23.

*Primary Examiner*—Robert L. Stoll
*Assistant Examiner*—Joseph D. Anthony
*Attorney, Agent, or Firm*—Finnegan, Henderson, Farabow, Garrett & Dunner

[57] ABSTRACT

There is disclosed a silver halide light-sensitive color photographic material having a high sensitivity and excellent granularity. The photographic material contains in at least one of the emulsion layers the core/shell type tabular silver halide grains comprising:

a. a numerical ratio of monodispersed grains to all grains of 70% or more;
b. an average aspect value of not less than 1 and less than 5; and
c. a portion having a silver iodide content of 15.3 mol % or more in the core.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE LIGHT SENSITIVE COLOR PHOTOGRAPHIC MATERIAL

This application is a continuation of application Ser. No. 07/577,745, filed Sep. 5, 1990, now abandoned.

FIELD OF THE INVENTION

The present invention relates to a silver halide light-sensitive color photographic material, specifically to a silver halide light-sensitive photographic material having high sensitivity, excellent graininess and improved storage stability.

BACKGROUND OF THE INVENTION

Recently, there has been increasing demand for higher sensitivity and more improved image quality.

One of the key factors affecting the sensitivity of a silver halide light-sensitive material and the quality of an image is silver halide grains. Efforts have been made in the art to develop silver halide grains for higher sensitivity and image quality.

It is generally known that image quality can be improved by employing silver halide grains with smaller grain sizes. However, such smaller grain sizes inevitably lower the sensitivity of a light-sensitive material and therefore, it is difficult to balance the sensitivity with the image quality.

There have been studied the methods of improving both sensitivity and image quality by controlling a sensitivity/size ratio of the silver halide grains. The examples thereof are the use of tabular silver halide grains, which are disclosed in Japanese Patent Publication Open to Public Inspection (hereinafter referred to as Japanese Patent O.P.I. Publication) Nos. 111935/1983, 111936/1983, 111937/1983, 113927/1983 and 99433/1984. These tabular grains have a larger surface area than those of regular octahedral, tetradecahedral and dodecahedral silver halide grains each having the same volume. Such larger surface area permits the silver halide grains to adsorb a larger amount of a sensitizing dye on the surface thereof and therefore to have an improved sensitivity.

Japanese Patent O.P.I. Publication No. 92942/1988 discloses tabular silver halide grains having therein a core of high AgI; Japanese Patent O.P.I. Publication No. 163451 discloses tabular hexagonal grains; and Japanese Patent O.P.I. Publication No. 163451/1988 discloses tabular silver halide grains having an aspect ratio of not less than 5. These methods can improve sensitivity and graininess to some extent, however, are insufficient for balancing a sensitivity with an image quality.

SUMMARY OF THE INVENTION

The object of the invention is to provide a silver halide light-sensitive color photographic material having an improved sensitivity, graininess and storage stability.

The above object can be attained by a silver halide light-sensitive color photographic material comprising a support and provided thereon at least one silver halide emulsion layer, wherein at least one of the emulsion layers contains core/shell type tabular silver halide grains comprising: a) a ratio of monodispersed grains of not less than 70% in terms of the number of the grains; b) an average aspect ratio (diameter/thickness) of not less than 1 and less than 5; and the portion having a silver iodide content of not less than 15.3 mol % in the core.

In a preferred embodiment, most of the tabular silver halide grains are hexagonal and the degree of monodispersion of the grains is less than 20%.

DETAILED DESCRIPTION OF THE INVENTION

In the invention, the tabular grain is defined by the grain having two major faces parallel to each other.

Tabular silver halide grains of the invention have an average diameter/thickness ratio (aspect ratio) of not less than 1 and smaller than 5, preferably not less than 1 and smaller than 4, more preferably not less than 1 and smaller than 3. The average aspect ratio is obtained by averaging the aspect ratios of all silver halide grains.

The diameter of a tabular silver halide grain, which is represented by the diameter of a circle having the same area as that of the projected major face of the grain, is preferably 0.1 to 5.0 μm, more preferably 0.2 to 4.0 μm, most preferably 0.3 to 3.0 μm.

The silver halide emulsion according to the invention is monodispersed. The monodispersed silver halide emulsion is defined by the silver halide emulsion containing 60% by weight or more of the silver halide grains with the sizes falling within the range of 80 to 120% of the average grain size $\bar{d}$. The above weight percentage is preferably not less than 65%, more preferably not less than 70% of all silver halide grains.

The average grain size $\bar{d}$ is defined by a diameter $d_i$ in which the product of $d_i^3$ and the number thereof $n_i$ is maximized. In the product, $n_i$ represents the frequency of grains having the grain-size $d_i$.

The significant figure is calculated down to the third decimal place and the fourth digit is rounded to the nearest whole number.

The grain diameters can be calculated by taking an electron microphotograph of a grain (x 10,000 to 50,000) and measuring the projected area of more than 1,000 grains selected arbitrarily on this photograph.

The silver halide emulsion used in the invention preferably has a degree of monodispersion of lower than 20%, more preferably lower than 18%, most preferably lower than 15%, wherein the degree of monodispersion is defined by the following formula:

$$\text{Degree of monodispersion} = \frac{\text{Standard deviation of grain diameter}}{\text{Average diameter}} \times 100$$

The numerical ratio of the tabular silver halide grains to all silver halide grains contained in the silver halide emulsion of the invention can be calculated by counting the number of grains on an electron microphotograph of the emulsion. The number of the tabular grains accounts for not less than 70%, preferably not less than 75%, more preferably not less than 80% of the total silver halide grains.

It is preferred that the tabular silver halide grains have mainly the hexagonal major faces.

The ratio of the major length to the minor one in the hexagonal major face is preferably not more than 2, more preferably not more than 1.8, most preferably not more than 1.5. This ratio can be calculated also by using an electron microphotograph of the silver halide emulsion. The tabular grains of 50% or more have preferably the hexagonal major faces.

The tabular silver halide grains of the invention is of a core/shell type in which high content silver iodide is localized in the core of the grain.

High content silver iodide localized in the core is identified by the average silver iodide contents $J_1$ and $J_3$ satisfying the following relationship:

$$J_1 > J_3$$

wherein $J_1$ represents an average silver iodide content measured by a fluorescent X-ray spectroscopy and $J_3$ represents the average value of silver iodide contents measured by an X-ray microanalysis in which the contents concerned are measured at the portions far away by 80% or more of a grain radius from the center thereof.

The high iodide portion in the grain has a silver content of higher than 15.3 mol %, preferably 18 to 45 mol %, more preferably 20 to 45 mol %, most preferably 25 to 45 mol %.

The silver halide emulsion used in the invention can be prepared by growing monodispersed spherical seed grains prepared by the method described in Japanese Patent O.P.I. Publication No. 6643/1986 under stirring with a stirrer disclosed in Japanese Patent O.P.I. Publication No. 92523/1982, at 500 to 1200 r.p.m. The seed grains can be grown by any of the acid method, the neutral method and the ammonia method, or by utilizing the known methods described in Japanese Patent Publication Nos. 6643/1986, 14630/1986, 112142/1986, 157024/1987, 18556/1987, 92942/1988, 151618/1988, 1613451/1988, 220238/1988 and 311244/1988. Water-soluble salts may be removed by a flocculation method or a noodle washing method.

Silver halides used in the invention are silver iodochloride and silver iodobromochloride and may be a surface latent image type or an inner latent image type.

The silver halide grains may be chemically sensitized by conventional methods, and spectrally sensitized to a prescribed wavelength with sensitizing dyes.

The silver halide emulsion may contain various additives such as an anti-foggant and a stabilizer. Gelatin is used preferably as the binder.

Emulsion layers and other hydrophilic colloid layers may be hardened and contain a plasticizer and a latex.

A coupler is contained in a silver halide light-sensitive emulsion layer.

There may be added a color coupler, a competitive coupler, and a compound capable of releasing by a coupling reaction with an oxidation product of a developing agent, various photographically useful fragments such as a development accelerator, a bleaching accelerator, a developing agent, a solvent for silver halide, a toning agent, a hardener, a fogging agent, an anti-foggant, a chemical sensitizer, a spectral sensitizer and a desensitizer.

There may be provided various auxiliary layers such as a filter layer, an anti-halation layer and an anti-irradiation layer. These layers and the silver halide emulsion layers may contain a dye which can be removed or bleached during development.

The light-sensitive material may contain conventional additives such as a formalin scavenger, a fluorescent bleaching agent, a matting agent, a lubricant, an image stabilizer, a surfactant, an anti-foggant, a development accelerator, a development retarder and a bleaching accelerator.

The support is polyethylene-coated paper, a polyethylene terephthalate film, baryta paper or a cellulose triacetate film.

The light-sensitive material of the invention is subjected to conventional processing after exposure.

EXAMPLES

The present invention will be described in more detail by referring to the following examples.

EXAMPLE 1

Preparation of Em-1

A comparative core/shell type emulsions was prepared according to the method described in Japanese Patent O.P.I. Publication No. 138538/1985, wherein the emulsion comprised octahedral silver iodobromide grains (average grain size: 1.3 μm, silver iodide content: 5 mol %).

Comparative emulsions, Em-2, Em-3 and Em-4 each consisting of core/shell type tabular silver halide grains were prepared by the following methods:

Preparation of Em-2

To 5 l of an aqueous 1.5% gelatin solution containing 44.9 g of potassium bromide, 119 ml of an aqueous solution containing 9.76 g of potassium bromide and 119 ml of an aqueous solution containing 13.96 g of silver nitrate were added with stirring at 70° C. and pH 5.8 at the equal flow rate by the double-jet method while maintaining pBr at 0.9. Subsequently, 2.0 l of an aqueous solution containing 337 g of silver nitrate and 2.0 l of an aqueous solution containing 200.3 g of potassium bromide and 49.3 g of potassium iodide were added at the equal flow rate by the double-jet method while maintaining pBr at 1.2. Next, 4.0 l of an aqueous solution containing 1685 g of silver nitrate and 4.0 l of an aqueous solution containing 1157 g of potassium bromide and 32.9 g of potassium iodide were added at the equal flow rate by the double-jet method while maintaining pBr at 1.2, to thereby prepare tabular silver halide grains. After desalting at 40° C., gelatin was added to the grains for redispersion. The dispersion was then cooled to 20° C. for coagulation, whereby 1.5 kg of a comparative silver halide emulsion were prepared.

Preparation of Em-3

To 5 l of an aqueous 1.5% gelatin solution containing 44.9 g of potassium bromide, 119 ml of an aqueous solution containing 9.76 g of potassium bromide and 119 ml of an aqueous solution containing 13.96 g of silver nitrate were added with stirring at 65° C. and pH 5.8 at the equal flow rate by the double-jet method while maintaining pBr at 0.9. Subsequently, 2.2 l of an aqueous solution containing 337 g of silver nitrate and 2.2 l of an aqueous solution containing 207.4 g of potassium bromide and 39.44 g of potassium iodide were added at the equal flow rate by the double-jet method while maintaining pBr at 1.2. Next, 4.2 l of an aqueous solution containing 1685 g of silver nitrate and 4.2 l of an aqueous solution containing 1157 g of potassium bromide and 32.9 g of potassium iodide were added at the same flow rate by the double-jet method while maintaining pBr at 1.2, to thereby prepare tabular silver halide grains. Then, desalting, redispersion and coagulation were performed in the same manner as in Em-2, whereby 1.5 kg of a comparative silver halide emulsion where prepared.

Preparation of Em-4

To 5 l of an aqueous 1.5% gelatin solution containing 44.9 g of potassium bromide, 119 ml of an aqueous solution containing 9.76 g of potassium bromide and 119 ml of an aqueous solution containing 13.96 g of silver nitrate were added with stirring at 70° C. and pH 5.8 at the equal flow rate by the double-jet method while maintaining pBr at 0.9. Subsequently, 2.8 l of an aqueous solution containing 337 g of silver nitrate and 2.8 l of an aqueous solution containing 2.8 l of an aqueous solution containing 193.2 g of potassium bromide and 59.2 g of potassium iodide were added at the equal flow rate by the double-jet method while maintaining pBr at 1.3. Next, 3.5 l of an aqueous solution containing 1685 g of silver nitrate and 3.5 l of an aqueous solution containing 1157 g of potassium bromide and 32.9 g of potassium iodide were added at the same flow rate by the double-jet method while maintaining pBr at 1.2, to thereby prepare tabular silver halide grains. Desalting, redispersion and coagulation were performed in the same manner as in Em-2, whereby 1.5 kg of a comparative emulsion were prepared.

Inventive emulsions Em-5 to 8 were prepared by the following procedures:

Preparation of Em-5

To 5 l of an aqueous 1.5% gelatin solution, there were added 300 g of a seed emulsion consisting of monodispersed spherical grains (0.082 mol silver halide), followed by stirring at 70° C. and pH 5.8. To the mixture, 2.5 l of an aqueous solution containing 337 g of silver nitrate and 2.5 l of an aqueous solution containing 193.2 g of potassium bromide and 59.2 g of potassium iodide were added at the equal flow rate by the double-jet method while maintaining pBr at 1.5. Next, 4.0 l of an aqueous solution containing 1685 g of silver nitrate and 4.0 l of an aqueous solution containing 1157 g of potassium bromide and 32.9 g of potassium iodide were added at the equal flow rate by the double-jet method while maintaining pBr at 1.5, to thereby prepare tabular silver halide grains. After desalting at 40° C., gelatin was added to the grains for redispersion, followed by cooling to 20° C. for coagulation, whereby, 1.5 kg of an inventive emulsion were prepared.

Stirring was made at 700 r.p.m. with a stirrer disclosed in Japanese Patent O.P.I. Publication No. 92523/1982.

Preparation of Em-6

The same seed emulsion 300 g as in Em-5 was added to 5 l of an aqueous 2.0% gelatin solution, followed by stirring at 75° C. and pH 5.8. To the mixture, 2.8 l of an aqueous solution containing 337 g of silver nitrate and 2.8 l of an aqueous solution containing 188.5 g of potassium bromide and 65.8 g of potassium iodide were added at the equal flow rate by the double-jet method while maintaining pBr at 1.5. Next, 3.5 l of an aqueous solution containing 1685 g of silver nitrate and 3.5 l of an aqueous solution containing 1157 g of potassium bromide and 32.9 g of potassium iodide were added at the equal flow rate by the double-jet method while maintaining pBr at 1.5, to thereby prepare tabular silver halide grains. Desalting, redispersion and coagulation were performed in the same manner as in Em-5, whereby 1.5 kg of an inventive emulsion were prepared.

Stirring was made at 800 r.p.m. with the same stirrer as in Em-5.

Preparation of Em-7

The same seed emulsion 300 g as in Em-5 was added to 4.5 l of an aqueous 1.5% gelatin solution, followed by stirring at 75° C. and pH 5.8. To the mixture, 2.4 l of an aqueous solution containing 337 g of silver nitrate and 2.4 l of an aqueous solution containing 183.8 g of potassium bromide and 72.4 g of potassium iodide were added at the equal flow rate by the double-jet method while maintaining pBr at 1.8.

Next, 4.0 l of an aqueous solution containing 1685 g of silver nitrate and 4.0 l of an aqueous solution containing 1157 g of potassium bromide and 32.9 g of potassium iodide were added at the equal flow rate by the double-jet method while maintaining pBr at 1.8, to thereby prepare tabular silver halide grains. Desalting, redispersion and coagulation were performed in the same manner as in EM-5, whereby 1.5 kg of an inventive emulsion were prepared.

Stirring was made in the same manner as in EM-6.

Preparation of EM-8

To 5 l of an aqueous 1.5% gelatin solution, there were added 300 g of the same seed emulsion as in EM-5, followed by stirring at 75° C. and pH 5.8. to the mixture, 2.2 l of an aqueous solution containing 337 g of silver nitrate and 2.2 l of an aqueous solution containing 189.7 g of potassium bromide and 64.2 g of potassium iodide were added at the equal flow rate by the double-jet method while maintaining pBr at 1.5. Next, 4.0 l of an aqueous solution containing 1685 g of silver nitrate and 4.0 l of an aqueous solution containing 1157 g of potassium bromide and 32.9 g of potassium iodide were added at the equal flow rate by the double-jet method while maintaining pBr at 1.8, to thereby prepare tabular silver halide grains. Desalting, redispersion and coagulation were performed in the same manner as in Em-5, whereby 1.5 kg of an inventive emulsion were prepared.

Stirring was made in the same manner as in Em-5.

The properties of EM-1 to 8 are shown in Table 1.

TABLE 1

| Emulsion No. | Shape of grain | Aspect ratio | Numberical ratio of tabular grains to all grains (%) | Average grain diameter (μm) | Silver iodide content (mol %) Average through grain | Silver iodide content (mol %) Core of grain | Degree of monodispersion | Ratio of hexagonal tabular grains to all tabular grains (%) |
|---|---|---|---|---|---|---|---|---|
| Em-1 (Comparison) | Octahedral | — | — | 1.3 | 5 | 20 | 15 | — |
| Em-2 (Comparison) | Tabular | 6.0 | 70 | 1.8 | 4.1 | 15 | 35 | 22 |
| Em-3 (Comparison) | Tabular | 4.0 | 70 | 1.4 | 3.6 | 12 | 30 | 45 |
| Em-4 (Comparison) | Tabular | 7.0 | 62 | 2.0 | 4.6 | 18 | 21 | 16 |
| Em-5 (Invention) | Tabular | 4.0 | 72 | 1.5 | 4.6 | 18 | 22 | 44 |
| Em-6 (Invention) | Tabular | 3.0 | 80 | 1.4 | 5.0 | 20 | 18 | 70 |
| Em-7 (Invention) | Tabular | 2.5 | 85 | 1.4 | 5.3 | 22 | 13 | 72 |

TABLE 1-continued

| Emulsion No. | Shape of grain | Aspect ratio | Numberical ratio of tabular grains to all grains (%) | Average grain diameter (μm) | Silver iodide content (mol %) Average through grain | Silver iodide content (mol %) Core of grain | Degree of monodispersion | Ratio of hexagonal tabular grains to all tabular grains (%) |
|---|---|---|---|---|---|---|---|---|
| Em-8 (Invention) | Tabular | 3.5 | 80 | 1.6 | 4.9 | 19.5 | 18 | 83 |

Five g of the magenta coupler M-1, 0.95 g of the colored magenta coupler CM-1 and 0.10 g of the DIR compound D-1 were dissolved in 5 ml of dibutyl phthalate. The solution was then mixed with 8 ml of an aqueous 1.0% solution of Alkanol B (alkylnapthalene sulfonate manufactured by Dupon Ltd.) and 70 ml of an aqueous 5% gelatin solution, followed by dispersing with of a colloid mill.

M-1

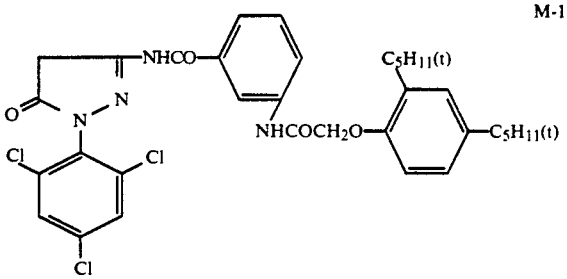

CM-1

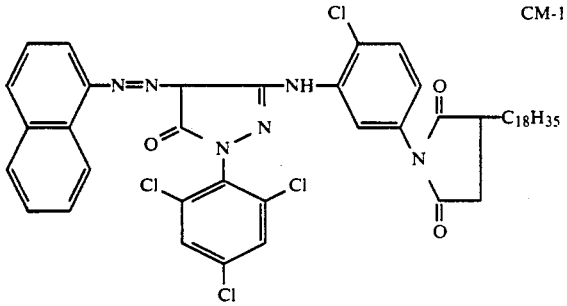

D-1

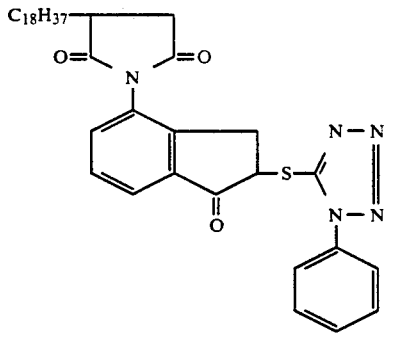

The above dispersion and 350 g (containing 40 g of silver) of Em-1 to 8 subjected to optimum sulfur sensitization, gold sensitization and green-sensitization were mixed and coated on a subbed cellulose triacetate film in a silver amount of 16 mg/dm$^2$.

Further, a protective layer containing 2.3 g/m$^2$ of gelatin was coated on the emulsion layer, whereby silver halide light-sensitive material Samples No. 1 to 8 were prepared.

Each sample was exposed to white light for sensitometry, and processed according to the following processing procedures. Then, sensitivity and RMS granularity were evaluated.

| Processing procedures (38° C.) | |
|---|---|
| Color developing | 3 min 15 sec |
| Bleaching | 6 min 30 sec |
| Rinsing | 3 min 15 sec |
| Fixing | 6 min 30 sec |
| Rinsing | 3 min 15 sec |
| Stabilizing | 1 min 30 sec |
| Drying | |

The composition of each processing liquid is as follows:

| Color developer | |
|---|---|
| 4-Amino-3-methyl-N-ethyl-N-(β-hydroxyethyl)aniline sulfate | 4.75 g |
| Sodium sulfite anhydrous | 4.25 g |
| Hydroxylamine ½ sulfate | 2.0 g |
| Potassium carbonate anhydrous | 37.5 g |
| Sodium bromide | 1.3 g |
| Trisodium nitrilotriacetate (monohydride) | 2.5 g |
| Potassium hydroxide | 1.0 g |

Water was added to make total quantity 1 liter, and pH was adjusted to 10.0.

| Bleacher | |
|---|---|
| Ferric ammonium ethylenediaminetetraacetate | 100 g |
| Ferric diammonium ethylenediaminetetraacetate | 10 g |
| Ammonium bromide | 150.0 g |
| Glacial acetic acid | 10.0 g |

Water was added to make total quantity 1 liter, and pH was adjusted to 6.0 with aqueous ammonia.

| Fixer | |
|---|---|
| Ammonium thiosulfate | 175.0 g |
| Ammonium sulfite anhydrous | 8.5 g |
| Sodium metasulfite | 2.3 g |

Water was added to make total quantity 1 liter, and pH was adjusted to 6.0 with acetic acid.

| Stabilizer | |
|---|---|
| Formalin (an aqueous 37% solution) | 1.5 ml |
| Konidax (manufactured by Konica Corp) | 7.5 ml |
| Water was added to make total quantity 1 liter. | |

Relative sensitivity is defined by a reciprocal of the exposure required to provide a density of a fog+0.1 and is a value relative to the green sensitivity of Sample No. 1, which is set at 100.

RMS is a value obtained by multiplying by 1000 times a standard deviation for the variation of a density in scanning a density of the minimum density+0.1 with a microdensitometer having a 250 $\mu m^2$ opening for scanning, and shown by a value relative to that of Sample No. 1, which is set at 100.

The evaluation results are shown in Table 2.

The results reveal that the samples of the invention are superior to the comparative samples in both sensitivity and granularity.

TABLE 2

| Sample No | Emulsion No. | Relative sensitivity | RMS |
|---|---|---|---|
| 1 (Comparison) | Em-1 | 100 | 100 |
| 2 (Comparison) | Em-2 | 104 | 108 |
| 3 (Comparison) | Em-3 | 102 | 103 |
| 4 (Comparison) | Em-4 | 102 | 106 |
| 5 (Invention) | Em-5 | 119 | 86 |
| 6 (Invention) | Em-6 | 121 | 82 |
| 7 (Invention) | Em-7 | 128 | 78 |
| 8 (Invention) | Em-8 | 127 | 82 |

EXAMPLE 2

The layers of the following compositions were provided on a subbed triacetyl cellulose in sequence from the support, to thereby prepare multilayered light-sensitive color photographic material Samples No. 9 to 16.

1st layer: anti-halation layer containing gelatin and black colloidal silver

2nd layer: interlayer containing gelatin and 2,5-di-t-octylhydroquinone

3rd layer: low speed red-sensitive silver halide emulsion layer

Monodispersed emulsion containing core/shell type AgBrI grains with an average diameter of 0.45 $\mu m$ and an AgI content of 7 mol %; the amount of silver coated: 1.8 $g/m^2$;

Sensitizing dye I . . . $5.0\times10^{-4}$ mol per mol silver
Sensitizing dye II . . . $0.7\times10^{-4}$ mol per mol silver
Cyan coupler C-1 . . . 0.10 mol per mol silver
Colored cyan coupler CC-1 . . . 0.002 mol per mol silver
DIR compound D-2 . . . 0.0005 mol per mol silver
DIR compound D-3 . . . 0.003 mol per mol silver
HBS-1A . . . 1.0 $g/m^2$ 4th layer: interlayer same as the 2nd layer 5th layer: high speed red-sensitive silver halide emulsion layer Emulsion shown in Table 3; the amount of silver coated: 2.2 $g/m^2$;

Sensitizing dye I . . . $2.6\times10^{-4}$ mol per mol silver
Sensitizing dye II . . . $0.7\times10^{-4}$ mol per mol silver
Cyan coupler C-1 . . . 0.004 mol per mol silver
Cyan coupler C-2 . . . 0.014 mol per mol silver
Colored Cyan coupler CC-1 . . . 0.0005 mol per mol silver
DIR compound D-3 . . . 0.0005 mol per mol silver
HBS-1A . . . 0.37 $g/m^2$ 6th layer: interlayer same as the 2nd layer 7th layer: low speed green-sensitive silver halide emulsion Emulsion same as in the 3rd layer; the amount of silver coated: 1.0 $g/m^2$;

Sensitizing dye III . . . $2.0\times10^{-4}$ mol per mol silver
Sensitizing dye IV . . . $1.0\times10^{-4}$ mol per mol silver
Magenta coupler M-1 . . . 0.090 mol per mol silver
Colored magenta coupler CM-1 . . . 0.007 mol per mol silver
DIR compound D-4 . . . 0.002 mol per mol silver
DIR compound D-5 . . . 0.003 mol per mol silver
HBS-2A . . . 0.90 $g/m^2$ 8th layer: interlayer same as the 2nd layer 9th layer: high speed green-sensitive silver halide emulsion Emulsion shown in Table 3; the amount of coated silver: 2.5 $g/m^2$.

Sensitizing dye III . . . $1.2\times10^{-4}$ mol per mol silver
Sensitizing dye IV . . . $0.8\times10^{-4}$ mol per mol silver
Magenta coupler M-1 . . . 0.01 mol per mol silver
Colored magenta coupler CM-1 . . . 0.005 mol per mol silver
DIR compound D-4 . . . 0.0002 mol per mol silver
HBS-2A . . . 0.22 $g/m^2$ 10th layer: yellow filter layer containing gelatin, yellow colloidal silver and 2,5-di-t-octylhydroquinone 11th layer: low speed blue-sensitive silver halide emulsion Emulsion same as in the 3rd layer; the amount of silver coated: 0.5 $g/m^2$;

Sensitizing dye V . . . $1.3\times10^{-4}$ mol per mol silver
Yellow coupler Y-1 . . . 0.35 mol per mol silver
HBS-2A . . . 0.25$g/m^2$ 12th layer: high speed blue-sensitive silver halide emulsion Emulsion shown in Table 3; the amount of silver coated: 1.2 $g/m^2$;

Sensitizing dye V . . . $1.8\times10^{-4}$ mol per mol silver
Yellow coupler Y-1 . . . 0.04 mol per mol silver
HBS-2A . . . 0.25 $g/m^2$ 13th layer: 1st protective layer containing silver iodobromide (AgI content: 1 mol %, average diameter: 0.07 $\mu m$) in the amount of silver coated: 0.4 $g/m^2$ and UV absorbers UV-1 and UV-2.

14th layer: 2nd protective layer containing polymethyl methacrylate (diameter: 1.5 $\mu m$) and formalin scavenger (HS-1)

In addition to the above components, gelatin hardeners(H-1) and (H-2), and a surfactant were added to each layer.

The compounds contained in each layer:

Sensitizing dye I:anhydro-5,5'-dichloro-9-ethyl-3,3'-di-(3-sulfopropyl)thiacarbocyanine hydroxide Sensitizing dye II: anhydro-9-ethyl-3,3'-di-(3-sulfopropyl)-4,5,4',5'-dibenzothiacarbocyanine hydroxide Sensitizing dye III: anhydro-5,5'-diphenyl-9-ethyl-3,3'-di-(3-sulfopropyl)oxycarbocyanine hydroxide Sensitizing dye IV: anhydro-9-ethyl-3,3'-di-(3-sulfopropyl)-5,6,5',6'-dibenzoxacarbocyanine hydroxide Sensitizing dye V: anhydro-3,3'-di-(3-sulfopropyl)-4,5-benzo-5'-methoxythiacyanine hydroxide C-1
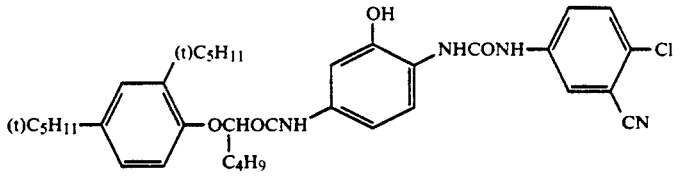
C-2
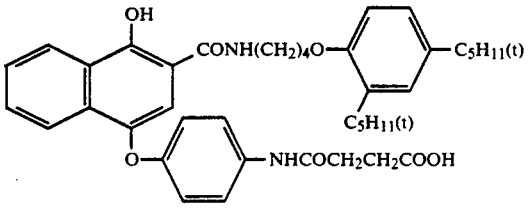
CC-1
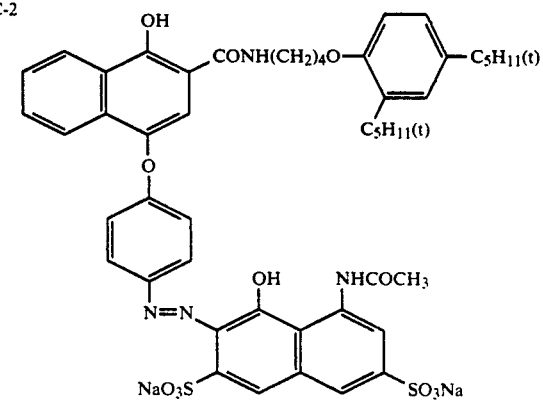
D-2
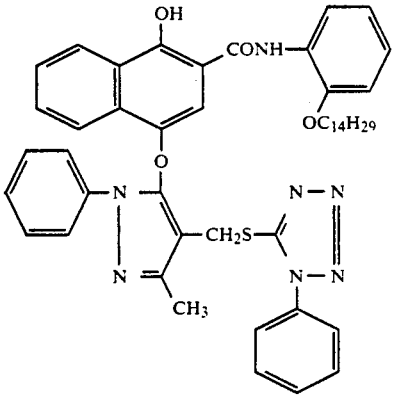
D-3
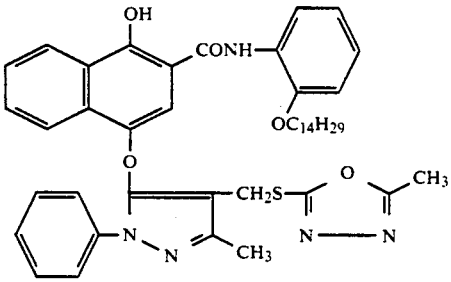
D-4
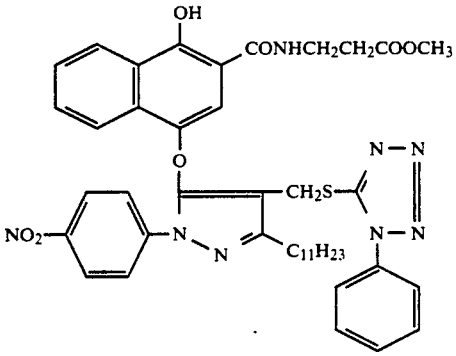
D-5
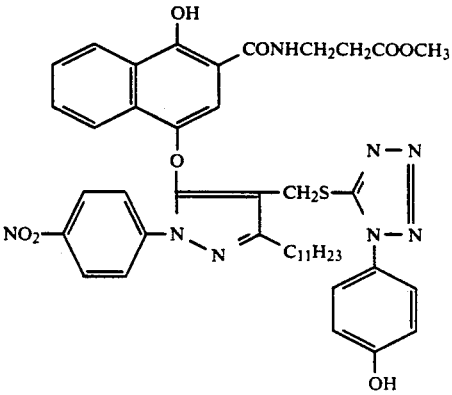

-continued

Y-1

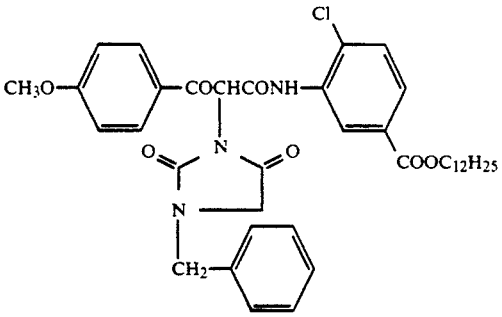

M-1

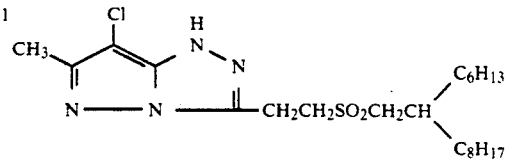

UV-1

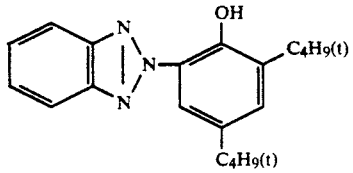

UV-2

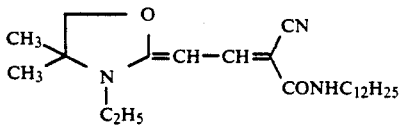

HS-1

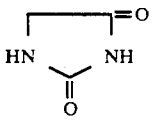

H-1

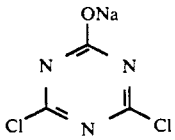

$[(CH_2{=}CHSO_2CH_2)_3CCH_3CCH_2SO_2CH_2CH_2]_2NCH_2CH_2SO_3K$ H-2

Dioctyl phthalate (DOP) HBS-1A

Tricresyl phosphate (TCP) HBS-2A

Sample Nos. 9 to 16 were exposed to white light through an optical wedge, and processed in the same manner as in Example 1.

Sensitivity and RMS granularity were evaluated for the high speed green-sensitive layers of the processed samples. The results are shown in Table 3. Sensitivity and granularity are the values relative to those of Sample No. 9, which are set at 100, respectively.

The results reveal that the samples of the invention are superior to the comparative samples in both sensitivity and RMS.

TABLE 3

| Sample No | Emulsion No. | Relative sensitivity | RMS |
|---|---|---|---|
| 9 (Comparison) | Em-1 | 100 | 100 |
| 10 (Comparison) | Em-2 | 106 | 108 |
| 11 (Comparison) | Em-3 | 103 | 106 |
| 12 (Comparison) | Em-4 | 104 | 105 |
| 13 (Invention) | Em-5 | 115 | 83 |
| 14 (Invention) | Em-6 | 128 | 78 |
| 15 (Invention) | Em-7 | 128 | 74 |
| 16 (Invention) | Em-8 | 121 | 80 |

EXAMPLE 3

Light-sensitive material samples prepared in Example 2 were stored under the following two different conditions. The stored samples were processed and evaluated in the same manner as in Example 2.

Conditions:

A: 65° C., 30% RH for 4 days

B: 50° C., 80% RH for 4 days

The results are shown in Table 4. Under either condition, the samples of the invention were superior to the comparative samples in both sensitivity and RMS granularity.

TABLE 4

| | | Condition A | | Condition B | |
|---|---|---|---|---|---|
| Sample No. | Emulsion No. | Relative sensitivity | RMS | Relative sensitivity | RMS |
| 17 (Comparison) | Em-1 | 100 | 100 | 100 | 100 |
| 18 (Comparison) | Em-2 | 102 | 110 | 104 | 107 |
| 19 (Comparison) | Em-3 | 94 | 109 | 95 | 104 |
| 20 (Comparison) | Em-4 | 98 | 105 | 101 | 110 |
| 21 (Invention) | Em-5 | 116 | 88 | 119 | 90 |
| 22 (Invention) | Em-6 | 128 | 82 | 127 | 84 |
| 23 (Invention) | Em-7 | 124 | 75 | 122 | 77 |
| 24 (Invention) | Em-8 | 119 | 80 | 118 | 81 |

What is claimed is:

1. A silver halide light-sensitive color photographic material comprising a support and provided thereon at least one silver halide emulsion layer, wherein at least one of the emulsion layers contains core/shell type tabular silver halide grains having hexagonal major faces wherein the ration of a major length to a minor length of the hexagonal major faces is 2 or less, comprising:

a. a numerical ratio of monodispersed grains to all grains of 70% or more;

b. an average aspect ratio greater than 1 and less than 5; and c. a portion having a silver iodide content of 15.3 mol % or more in the core.

2. The photographic material of claim 1, wherein the numerical ratio of the monodispersed grains is 75% or more.

3. The photographic material of claim 2, wherein the numerical ratio is 80% or more.

4. The photographic material of claim 1, wherein the average aspect ratio is greater than 1 and less than 4.

5. The photographic material of claim 4, wherein the average aspect ratio is greater than 1 and less than 3.

6. The photographic material of claim 1, wherein the silver iodide content in said portion is 18 to 45 mol %.

7. The photographic material of claim 6, wherein the silver iodide content is 20 to 45 mol %.

8. The photographic material of claim 7, wherein the silver iodide content is 25 to 45 mol %.

9. The photographic material of claim 1, wherein the ratio is 1.8 or less.

10. The photographic material of claim 9, wherein the ratio is 1.5 or less.

11. The photographic material of claim 1, wherein the numerical ratio of the hexagonal tabular grains to all grains is 50% or more.

12. The photographic material of claim 1, wherein the tabular silver halide grains have a monodispersion degree of less than 20%, provided that the monodispersion degree of 20% is defined by that the sizes of 60% by weight or more of the grains fall within the range of 80 to 120% of an average grain size.

13. The photographic material of claim 12, wherein the monodispersion degree is less than 18%.

14. The photographic material of claim 13, wherein the monodispersion degree is less than 15%.

15. The photographic material of claim 1, wherein the tabular silver halide grains have an average grain diameter of 0.1 to 5.0 μm, provided that the the diameter of the tabular grain is defined by the diameter of a circle having the same area as that of a projected major face of the tabular grain.

16. The photographic material of claim 15, wherein the average grain diameter is 0.2 to 4.0 μm.

17. The photographic material of claim 16, wherein the average grain diameter is 0.3 to 3.0 μm.

* * * * *